(12) United States Patent
Masuyama

(10) Patent No.: US 8,988,700 B2
(45) Date of Patent: Mar. 24, 2015

(54) PRINT CONTROL APPARATUS THAT PERFORMS CONTINUED PROCESSING OF JOB WHEN POWER IS RESTORED, METHOD OF CONTROLLING THE SAME, AND STORAGE MEDIUM

(71) Applicant: Canon Kabushiki Kaisha, Tokyo (JP)

(72) Inventor: Yuka Masuyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 40 days.

(21) Appl. No.: 13/771,336

(22) Filed: Feb. 20, 2013

(65) Prior Publication Data

US 2013/0222841 A1 Aug. 29, 2013

(30) Foreign Application Priority Data

Feb. 23, 2012 (JP) ................................ 2012-037327

(51) Int. Cl.
*G06K 15/00* (2006.01)
*G06K 15/02* (2006.01)

(52) U.S. Cl.
CPC ............ *G06K 15/02* (2013.01); *G06K 15/4055* (2013.01); *G06K 15/1817* (2013.01)
USPC ......... 358/1.14; 358/1.16; 358/1.13; 358/1.1; 399/82; 399/75; 399/83

(58) Field of Classification Search
None
See application file for complete search history.

(56) References Cited

U.S. PATENT DOCUMENTS

| | | | | |
|---|---|---|---|---|
| 7,106,465 | B1 * | 9/2006 | Simpson et al. | 358/1.15 |
| 7,365,870 | B2 * | 4/2008 | Ferlitsch | 358/1.15 |
| 7,869,733 | B2 * | 1/2011 | Sato | 399/82 |
| 8,400,659 | B2 * | 3/2013 | Sasaki | 358/1.15 |
| 2007/0285717 | A1 * | 12/2007 | Muto et al. | 358/1.16 |

FOREIGN PATENT DOCUMENTS

JP 2000-250362 A 9/2000

* cited by examiner

*Primary Examiner* — Paul F Payer
(74) *Attorney, Agent, or Firm* — Rossi, Kimms & McDowell LLP

(57) ABSTRACT

A print control apparatus which is capable of performing continued processing of a job upon power restoration of the print control apparatus, according to the status of the job before power-off of the apparatus. A job management section cancels jobs in progress according to a power-off instruction. A job analysis section determines the status of each cancelled job. The job management section sets discrimination information for a job to be processed after power restoration of the print control apparatus, according to the determined status of the job. The job analysis section 206 determines discrimination information of each job stored in a storage section upon power restoration of the print control apparatus. The print control apparatus executes continued processing of the job according to a result of determination by the job analysis section.

19 Claims, 16 Drawing Sheets

FIG. 12A

| POWER-OFF CONFIGURATION | | | |
|---|---|---|---|
| POST-RESTORATION PROCESSING SETTING | 1102 AUTO | 1103 RESUME FROM STOPPED POSITION | 1104 REPROCESS FROM START |
| 1105 PRINT-IN-PROGRESS JOB | ☑ | ☐ | ☐ |
| 1106 RIP-IN-PROGRESS JOB | ☑ | ☐ | ☐ |
| 1107 PRINT-AWAITING JOB | ☑ | | |
| 1108 RIP WHILE PRINT-IN-PROGRESS | ☑ | | |

BEFORE POWER-OFF

1109 ☑ NOTIFY USER OF PROCESSING DETAILS BEFORE POWER-OFF

AFTER POWER RESTORATION

1110 ☑ NOTIFY USER OF COMPLETION OF PROCESSING PERFORMED AFTER COMPLETION OF JOB-ASSOCIATED RESTORATION PROCESS

1111 ☑ NOTIFY USER OF INSTRUCTION FOR POWERING ON MAIN UNIT AFTER COMPLETION OF JOB-ASSOCIATED POWER RESTORATION PROCESS

FIG. 12B

AFTER POWER RESTORATION

1110 ☑ NOTIFY USER OF COMPLETION OF PROCESSING PERFORMED AFTER COMPLETION OF JOB-ASSOCIATED RESTORATION PROCESS

1111 ☑ NOTIFY USER OF INSTRUCTION FOR POWERING ON MAIN UNIT AFTER COMPLETION OF JOB-ASSOCIATED POWER RESTORATION PROCESS

1601 ☑ PRINT POWER OFF-ON NOTIFICATION PAGE AFTER COMPLETION OF POWER RESTORATION

FIG. 13A

PRINT CONTROL APPARATUS IS GOING TO BE POWERED OFF.

RIPPING OF JOB A BEING RIPPED WILL BE AUTOMATICALLY STARTED AFTER POWER RESTORATION, AND BE STORED IN WAITING QUEUE.

JOB B BEING PRINTED WILL BE STORED IN PRINT QUEUE AFTER POWER RESTORATION.

FIG. 13B

POST-RESTORATION PROCESSING OF PRINT CONTROL APPARATUS IS COMPLETED.

JOB A HAS BEEN STORED IN WAITING QUEUE AS RIPPED JOB.

JOB B HAS BEEN STORED IN PRINT QUEUE AS PRINT-AWAITING JOB.

FIG. 13C

POST-RESTORATION PROCESSING OF PRINT CONTROL APPARATUS IS COMPLETED.

PRINT-AWAITING JOB EXISTS. POWER ON MAIN UNIT AND RESUME PRINTING.

FIG. 13D

SPOOLING OF JOB A IS SUSPENDED BY POWER-OFF INSTRUCTION.

TRANSMIT JOB A AGAIN.

PRINT CONTROL APPARATUS THAT PERFORMS CONTINUED PROCESSING OF JOB WHEN POWER IS RESTORED, METHOD OF CONTROLLING THE SAME, AND STORAGE MEDIUM

BACKGROUND OF THE INVENTION

1. Field of the Invention

The present invention relates to a print control apparatus, a method of controlling the print control apparatus, and a storage medium, and more particularly to a technique for controlling continued processing of a job upon restoration of the power of a print control apparatus powered off during processing of the job.

2. Description of the Related Art

In recent years, to cope with environmental problems, there is an increasing demand for a printing system equipped with functions for enhanced power consumption efficiency and power saving effects. As examples of the functions, there have been proposed power-off functions, such as a remote shutdown and a weekly shutdown, which meet needs of various situations. The printing system includes, for example, one constructed by an image forming apparatus alone, and one constructed by an image forming apparatus and a print control apparatus.

The remote shutdown is a function capable of transmitting a power-off instruction to the printing system by remote operation. The weekly shutdown is a function capable of automatically powering off the printing system on a particular day and time of the week. Some of these functions are capable of not only powering off the image forming apparatus alone but also powering off the image forming apparatus and the print control apparatus in an interlocking manner, by regarding the apparatuses as one printing system.

In the printing system in which the image forming apparatus and the print control apparatus are connected to each other, when the print control apparatus has received a power-off instruction from the image forming apparatus, all jobs in progress (during printing, during RIP (Raster Image Processing), and during spooling) by the print control apparatus are cancelled, and the print control apparatus is powered off. After restoration of the power of the print control apparatus, all the cancelled jobs are left in a printed queue as cancelled jobs. Therefore, the jobs in progress before the power-off of the print control apparatus are required to be reselected by a user for proper reprocessing after power restoration of the print control apparatus.

To solve the above-described problem, there has been proposed a method of controlling the image forming apparatus, in which continued processing of a job is efficiently executed after the power of the image forming apparatus is restored (see e.g. Japanese Patent Laid-Open Publication No. 2000-250362). In Japanese Patent Laid-Open Publication No. 2000-250362, upon restoration of the power of the image forming apparatus, the user is prompted to input a user code, and when the user code matches user information of a stored cancelled print job, the user is prompted to select whether or not to continue the print job, thereby controlling continued processing of the job. This technique makes it possible for the user to easily identify a job cancelled by power-off of the image forming apparatus, upon restoration of the power thereof, and perform a necessary operation thereon, whereby it is possible to save time and labor required for inputting the job again.

In Japanese Patent Laid-Open Publication No. 2000-250362, however, it is necessary to wait for input of a user code and an instruction for continued printing upon restoration of the power of the image forming apparatus, and hence even when a job which can continue to be processed simply by power restoration, the continued processing is not started automatically, which degrades operability.

Further, in Japanese Patent Laid-Open Publication No. 2000-250362, without taking the status of a job cancelled by power-off into account, the user is inquired of whether or not to continue the job. This requires the user to determine whether or not to continue the job after comprehending the status of the cancelled job, and therefore there is a fear that the user is required to perform a high-level determination.

SUMMARY OF THE INVENTION

The present invention provides a print control apparatus which is capable of performing continued processing of a job when the power of the print control apparatus is restored, according to the status of the job before power-off of the print control apparatus, a method of controlling the print control apparatus, and a storage medium.

In a first aspect of the present invention, there is provided a print control apparatus that is connected to an image forming apparatus and is powered off in a manner interlocked with the image forming apparatus according to a power-off instruction, comprising a storage section configured to store jobs, a cancellation unit configured to cancel jobs in progress according to the power-off instruction, a job analysis unit configured to determine a status of each job cancelled by the cancellation unit, a post-restoration processing-setting unit configured to set discrimination information for each job to be processed after power restoration of the print control apparatus, according to the status of the job determined by the job analysis unit, a storage unit configured to store the jobs cancelled by the cancellation unit in the storage section according to the discrimination information set by the post-restoration processing-setting unit, a discrimination information determination unit configured to determine discrimination information of each job stored in the storage unit upon power restoration of the print control apparatus, and a post-restoration continued processing unit configured to execute continued processing of each job stored in the storage section according to a result of determination by the discrimination information determination unit.

In a second aspect of the present invention, there is provided a method of controlling a print control apparatus that includes a storage section for storing jobs, and is connected to an image forming apparatus and is powered off in a manner interlocked with the image forming apparatus according to a power-off instruction, comprising cancelling jobs in progress according to the power-off instruction, determining a status of each cancelled job, setting discrimination information for each job to be processed after power restoration of the print control apparatus, according to the determined status of the job, storing each cancelled job in the storage section according to the set discrimination information, determining discrimination information of each job stored in the storage section upon power restoration of the print control apparatus, and executing continued processing of each job stored in the storage section according to a result of determination of the discrimination information.

In a third aspect of the present invention, there is provided a non-transitory computer-readable storage medium storing a computer-executable program for causing a computer to execute a method of controlling a print control apparatus that includes a storage section for storing jobs, and is connected to an image forming apparatus and is powered off in a manner interlocked with the image forming apparatus according to a power-off instruction, wherein the method comprises cancelling jobs in progress according to the power-off instruction, determining a status of each cancelled job, setting discrimination information for each job to be processed after power restoration of the print control apparatus, according to the determined status of the job, storing each cancelled job in the storage section according to the set discrimination information, determining discrimination information of each job stored in the storage section upon power restoration of the print control apparatus, and executing continued processing of each job stored in the storage section according to a result of determination of the discrimination information.

According to the present invention, it is possible to perform continued processing of a job when the power of the print control apparatus is restored, according to the status of the job before power-off of the print control apparatus. As a consequence, a user can perform operations upon restoration of the print control apparatus without being conscious of the status of the job before the power-off, and without instructing reprocessing of the job. Further, it is possible to improve operability and overall productivity without requiring sophisticated determination by the user.

Further features of the present invention will become apparent from the following description of exemplary embodiments with reference to the attached drawings.

BRIEF DESCRIPTION OF THE DRAWINGS

FIGS. 12A and 12B are diagrams of examples of a power-off configuration screen displayed on a display section of the print control apparatus.

FIGS. 13A to 13D are diagrams of examples of messages displayed on the display section of the print control apparatus.

DESCRIPTION OF THE EMBODIMENTS

The present invention will now be described in detail below with reference to the accompanying drawings showing embodiments thereof.

Figure 1:
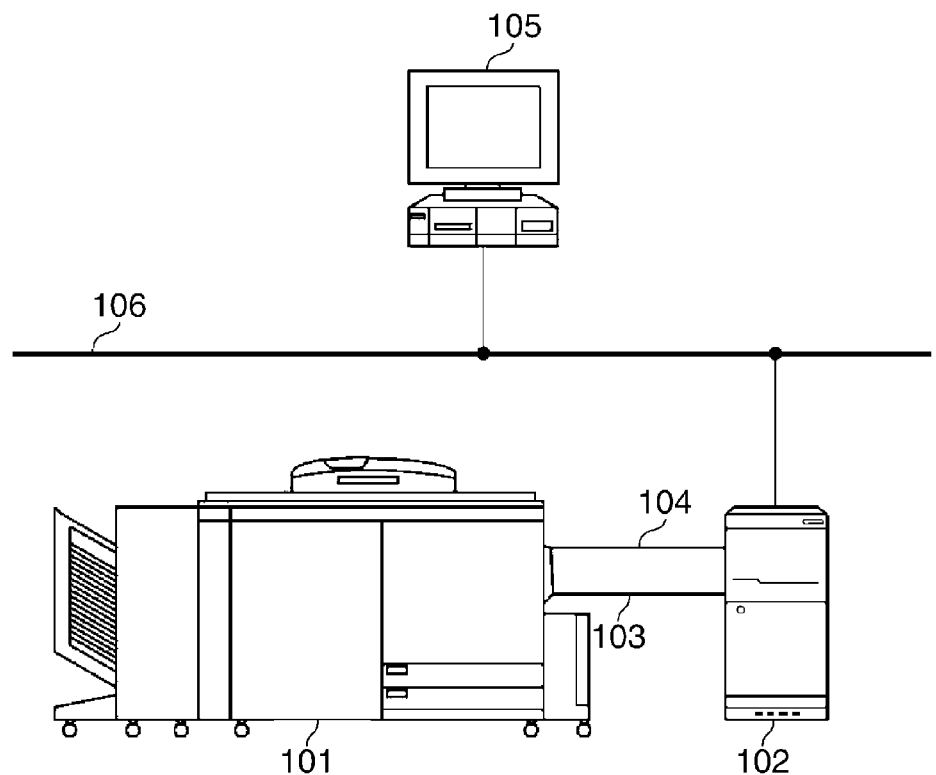
FIG. 1 is a schematic diagram of a typical printing system including a print control apparatus according to a first embodiment of the present invention.

FIG. 1 is a schematic diagram of a typical printing system including a print control apparatus according to a first embodiment of the present invention.

The printing system according to the present embodiment comprises an image forming apparatus 101, the print control apparatus, denoted by reference numeral 102, and a client PC 105. The image forming apparatus 101, the print control apparatus 102, and the client PC 105 are communicably connected to each other via a network 106, such as a LAN (local area network) or a WAN (wide area network). The image forming apparatus 101 and the print control apparatus 102 are connected by an image transfer cable 104 and a local network 103.

The image forming apparatus 101 is equipped with various functions, such as a scan function, a print function, and a copy function. The print control apparatus 102 is equipped with a function of receiving a job via the network 106 to perform RIP processing, and transmitting image data to the image forming apparatus 101 via the image transfer cable 104.

The image forming apparatus 101 and the print control apparatus 102 communicate print commands, status information, and so forth, via the local network 103. The print control apparatus 102 is capable of monitoring the image forming apparatus 101 connected thereto and the statuses of all print jobs, and performing job control, such as suspension of a print job, change of settings, resumption of printing, or duplication, movement, deletion, and so forth of a print job. Further, the print control apparatus 102 is capable of being started alone even in the power-off state of the image forming apparatus 101 to receive a job, and perform RIP processing of the job, job management, and so forth. Further, the print control apparatus 102 is powered off in a manner interlocked with the image forming apparatus 101 depending on a setting of the print control apparatus 102.

The client PC 105 is equipped with functions of editing an application file and instructing printing. Further, the client PC 105 is equipped with a function of assisting the monitoring and control of the image forming apparatus 101 and the print jobs managed by the print control apparatus 102. A user is capable of checking e.g. the status of a job using the client PC 105.

Figure 2:
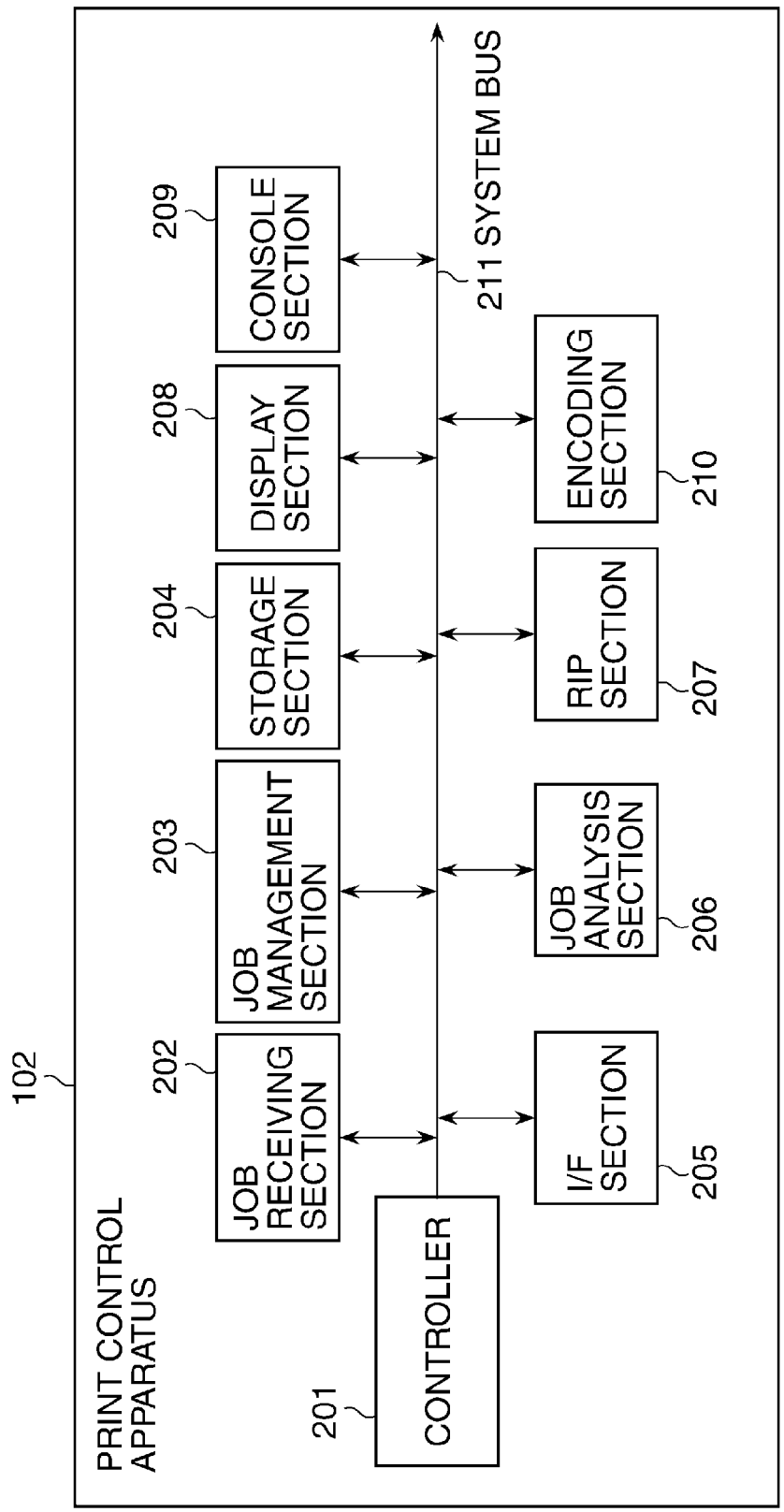
FIG. 2 is a block diagram of the basic configuration of the print control apparatus appearing in FIG. 1.

FIG. 2 is a block diagram of the basic configuration of the print control apparatus 102 appearing in FIG. 1.

The print control apparatus 102 comprises a controller 201, a job receiving section 202, a job management section 203, a storage section 204, an interface (I/F) section 205, a job analysis section 206, a RIP section 207, a display section 208, a console section 209, and an encoding section 210.

The controller 201 controls the functional sections connected to each other via a system bus 211 to thereby control the overall operation of the print control apparatus 102. Further, the controller 201 executes programs stored in the storage section 204 to thereby control the functional sections of the print control apparatus 102.

The job receiving section 202 receives a job transmitted from the client PC 105 in response to a print instruction from the user, and transfers the job to the job analysis section 206. The job analysis section 206 analyses the settings and status of the received job, and transmits the job to the RIP section 207 or the storage section 204 according to the result of the analysis.

The RIP section 207 performs RIP (Raster Image Processor) processing on data in a print language, such as PDL (page description language), or in a specific data format, received form the job analysis section 206, to thereby convert the same to raster image data. The encoding section 210 converts the raster image data to print data in a format or data in a data format supported by the image forming apparatus 101.

The storage section 204 temporarily stores the received print data (have the data spooled) and the data having been subjected to the RIP processing by the RIP section 207. This storage section 204 stores a received job in an appropriate queue according to the status of the job. Further, the storage section 204 stores various kinds of control information and setting information.

The job management section 203 manages jobs e.g. by suspending or canceling a job being executed, and resetting, deleting, duplicating or resuming a job. The interface section 205 transfers print commands and image data to the image forming apparatus 101. The display section 208 performs display of images and characters for notifying information to the user and performs control required for the display. The console section 209 includes buttons, keys, a touch panel, and so forth, and is provided for enabling the user to operate the print control apparatus 102.

Figure 3:
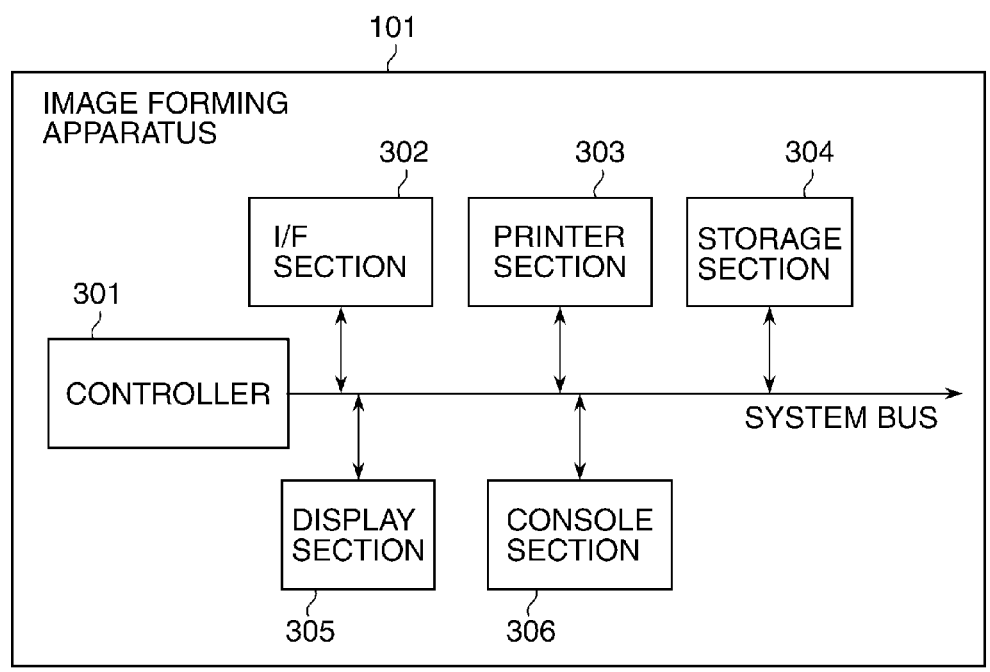
FIG. 3 is a block diagram of the basic configuration of an image forming apparatus appearing in FIG. 1.

FIG. 3 is a block diagram of the basic configuration of the image forming apparatus 101 appearing in FIG. 1.

The image forming apparatus 101 comprises a controller 301, an interface (I/F) section 302, a printer section 303, a storage section 304, a display section 305, and a console section 306.

The controller 301 controls the overall operation of the image forming apparatus 101. Specifically, the controller 301 executes programs stored in the storage section 304 to thereby control the functional sections of the image forming apparatus 101.

The console section 306, which is provided for the user to carry out various input operations, includes a touch panel and keys, and transmits input information to the controller 301. The display section 305 displays various kinds of displays of images and characters for the user, and controls the display of a touch panel section, not shown, the display of an LED (light emitting diode), not shown, and the like.

The interface section 302 receives a print command and image data from the interface section 205 of the print control apparatus 102, and transfers the image data to the printer section 303 according to the print command. The printer section 303 performs printing of image data subjected to the RIP processing by the RIP section 207 of the print control apparatus 102 and encoded by the encoding section 210 of the print control apparatus 102. The storage section 304 is implemented by a nonvolatile memory, such as a hard disk, and stores image data generated by various processes, as well as control information and setting information for use in the various processes.

Figure 4:
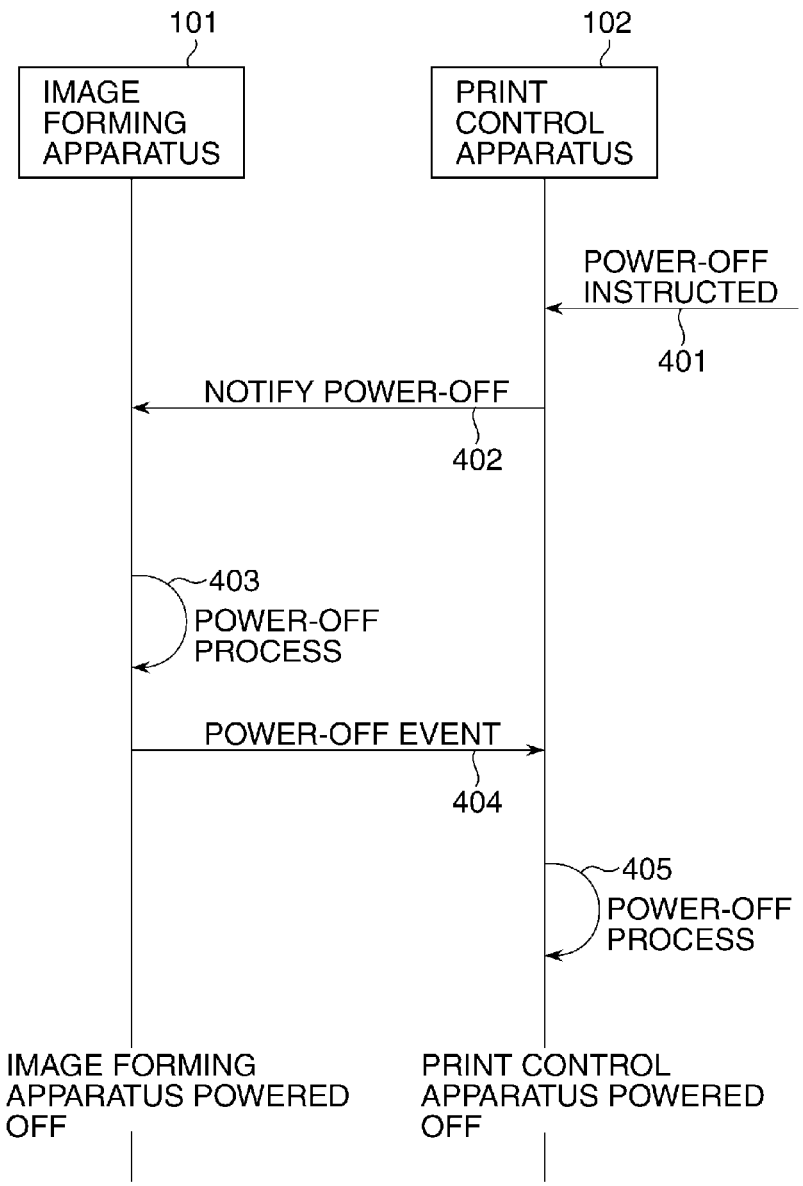
FIG. 4 is a sequence diagram showing a case where the print control apparatus and the image forming apparatus are powered off.

FIG. 4 is a sequence diagram showing a case where the print control apparatus 102 and the image forming apparatus 101 are powered off according to a power-off instruction from the outside of the print control apparatus 102.

Although in the present embodiment, a description will be given of a case where the image forming apparatus 101 and the print control apparatus 102 are powered off by a power-off instruction from outside, this is not limitative, but the present invention may be applied to any case other than a case where they are powered off by forced termination due to error. Particularly, the present invention is effective in the case where the power-off is performed according to a power-off instruction from outside, a case where the power-off of the apparatuses is performed on a predetermined date and time, and a case where the power-off is preferentially performed even when the printing system is performing print processing.

The print control apparatus 102 receives (information of) a power-off instruction from the outside of the print control apparatus 102 (401). Examples of a transmission source of the power-off instruction include an application that gives a power-off instruction to a printing system when all systems in a building are powered off during a power failure in the building. Upon receipt of the power-off instruction, the print control apparatus 102 notifies the image forming apparatus 101 of the power-off instruction (402). In response to the power-off notification, the image forming apparatus 101 promptly starts a power-off process (403). For example, when a power-off instruction is given due to a power failure in the whole building, it is required to promptly turn off the power of the image forming apparatus 101 within several seconds even when there is a job under printing.

After starting the power-off process, the image forming apparatus 101 transmits a power-off event to the print control apparatus 102 (404), and turns off the power after termination of the power-off process. The print control apparatus 102 receives the power-off event from the image forming apparatus 101 (404), and starts a power-off process (405). After termination of the power-off process, the power of the print control apparatus 102 is turned off. Details of the power-off process will be described hereinafter.

Note that the client PC 105 is a general personal computer, and therefore description thereof is omitted.

Figure 5:
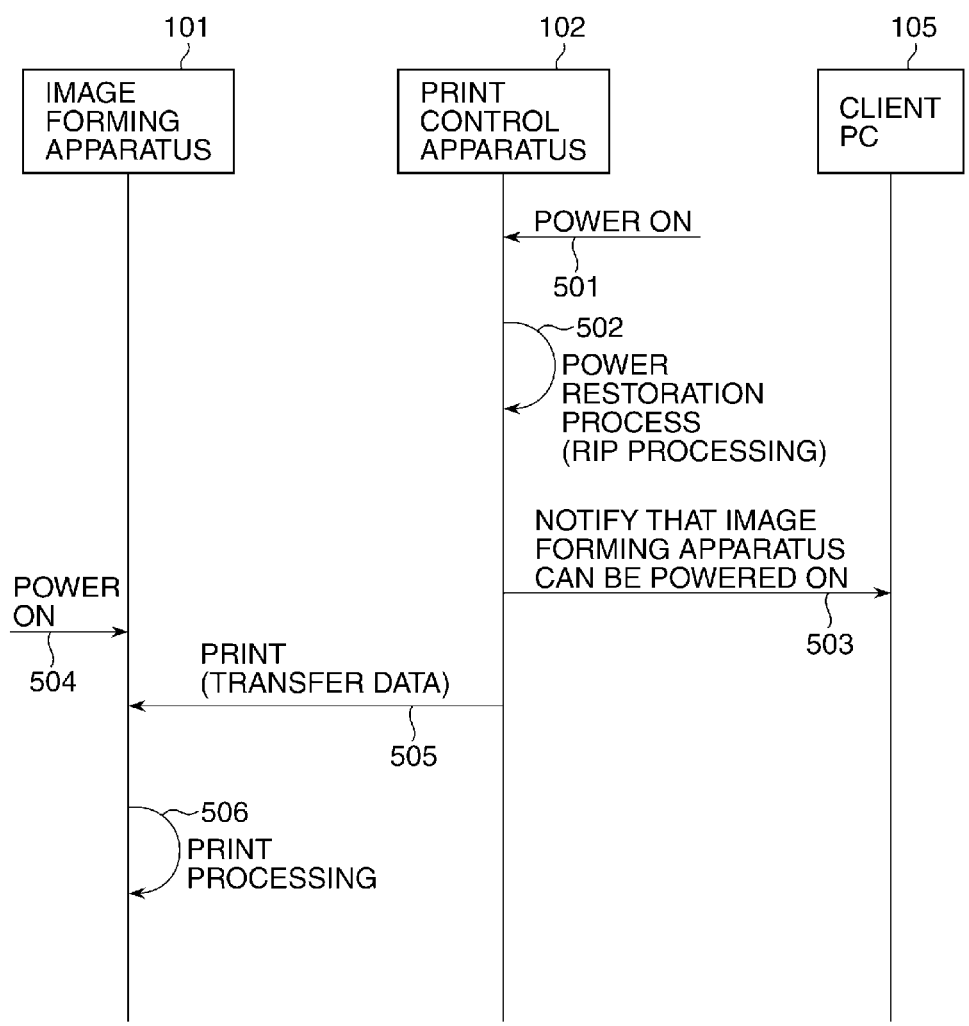
FIG. 5 is a sequence diagram showing a case where out of the image forming apparatus and the print control apparatus both in a power-off state, the power of only the print control apparatus is restored.

FIG. 5 is a sequence diagram in a case where out of the image forming apparatus 101 and the print control apparatus 102 both in a power-off state, the power of only the print control apparatus 102 is restored.

In a case of a printing system in which the image forming apparatus 101 and the print control apparatus 102 are locally connected to each other, there is a use case where only the print control apparatus 102 is singly started to perform setting necessary for the job configuration. For example, when a power failure in the building is resolved and the power supply to the building is restored (501), the print control apparatus 102 starts a restoration process immediately after restoration of the power supply (502). Here, if there is a job cancelled when the print control apparatus 102 is powered off, appropriate continued processing (e.g. RIP processing) is performed according to the status of the cancelled job. Details of the restoration process of the print control apparatus 102 will be described hereinafter.

After the restoration process of the print control apparatus 102, the print control apparatus 102 notifies the client PC 105 that the image forming apparatus 101 can be powered on (503). The user, upon receipt of the notification from the client PC 105, causes the power of the image forming apparatus 101 to be restored (504). In a case where there is a print-awaiting job stored in the print control apparatus 102, the print control apparatus 102 transfers image data of the job to the image forming apparatus 101 after the image forming apparatus 101 is powered on (505). The image forming apparatus 101 executes printing of the transferred image data (506).

Next, the power-off process executed by the print control apparatus 102 after the print control apparatus 102 has received the power-off instruction from the image forming apparatus 101 will be described with reference to FIG. 6.

Figure 6:
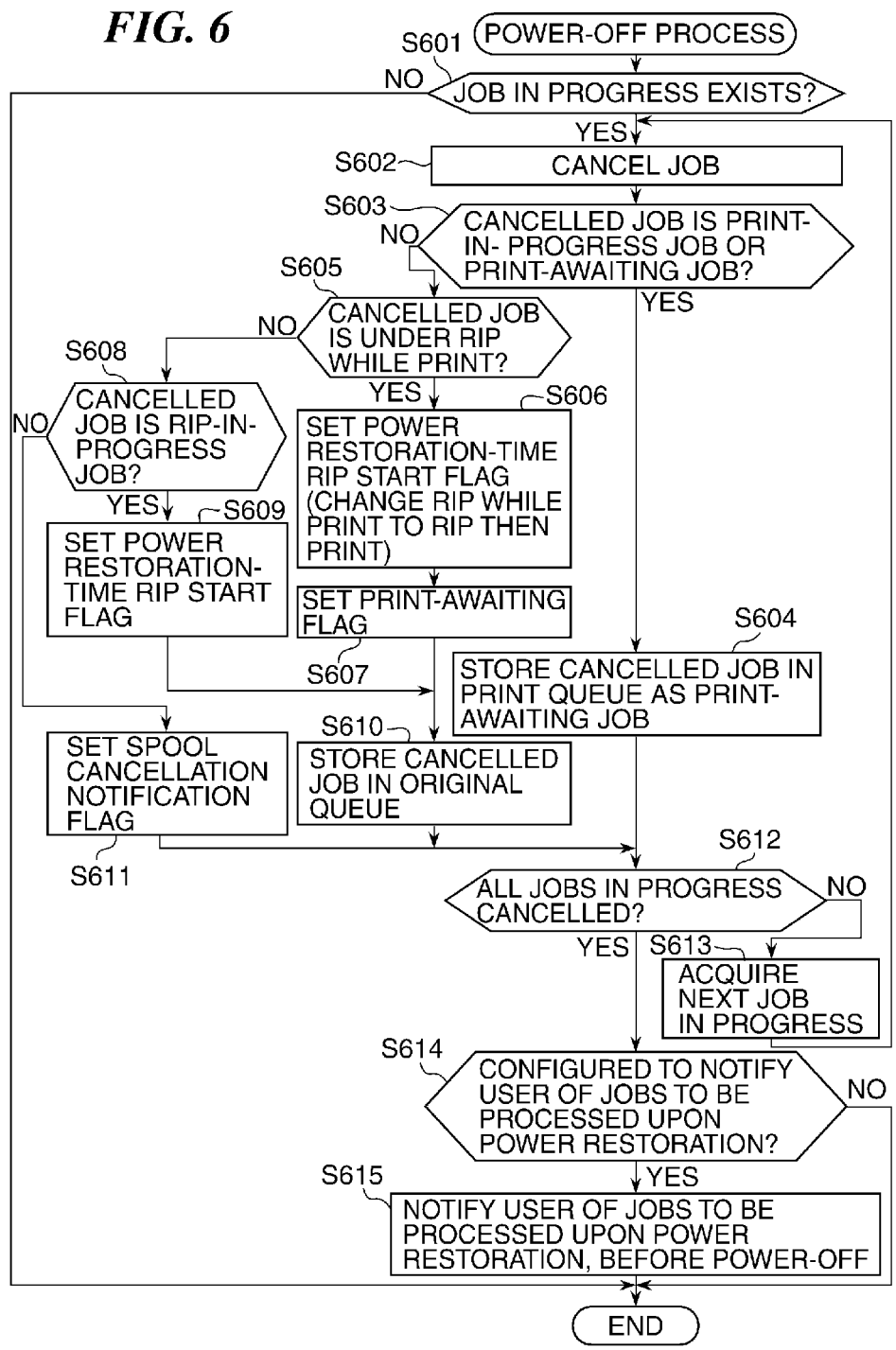
FIG. 6 is a flowchart of a power-off process executed by the print control apparatus.

FIG. 6 is a flowchart of the power-off process executed by the print control apparatus 102. Note that a program for executing the power-off process is stored in the storage section 204 of the print control apparatus 102, and is executed by the controller 201.

In a step S601, the job analysis section 206 determines whether or not there is a job in progress in the RIP section 207, the job receiving section 202 or the interface section 205. If it is determined that there is a job in progress, the process proceeds to a step S602, whereas if it is determined that there is no job in progress, the present process is immediately terminated.

In the step S602, the job management section 203 cancels the job which has been determined to be in progress in the step S601.

In a step S603, the job analysis section 206 determines whether or not the job cancelled in the step S602 has been a job under printing (print-in-progress job) or a print-awaiting job. If it is determined that it has been a print-in-progress job or a print-awaiting job, the process proceeds to a step S604, whereas if it is determined that it has not been a print-in-progress job or a print-awaiting job, the process proceeds to a step S605.

In the step S604, the storage section 204 stores the cancelled job in a print queue of the storage section 204 as a print-awaiting job, and the process proceeds to a step S612. Details of the print queue will be described hereinafter with reference to FIG. 9.

In the step S605, the job analysis section 206 determines whether or not the job cancelled by the job management section 203 has been under "RIP while print". The term "RIP while print" is intended to mean processing in which as the RIP processing is performed on the job from a leading page thereof, printing is sequentially executed on the job from a page having gone through the RIP processing. Another example of the RIP and print processing is "RIP then print". This is processing in which printing is started after the RIP processing on all pages is completed. If it is determined that the job cancelled by the job management section 203 has been under "RIP while print", the process proceeds to a step S606. On the other hand, if it is determined that the job cancelled by the job management section 203 has not been under "RIP while print", the process proceeds to a step S608.

In the step S606, the job management section 203 sets a power restoration-time RIP start flag (discrimination information) for starting the RIP processing upon power restoration of the print control apparatus 102, for the job which has been determined to be under "RIP while print" in the step S605. This process changes a job input as a "RIP while print" job to the print control apparatus 102 to a "RIP then print" job. Further, even when no power is supplied to the image forming apparatus 101, the RIP processing can be executed upon power restoration of the print control apparatus 102. Further, after the power of the image forming apparatus 101 is restored, only the printing process can be executed, whereby it is possible to shorten a processing time period required to process the whole job.

In a step S607, the job management section 203 sets a print awaiting flag (discrimination information) for the job which has been determined to be under "RIP while print", and the process proceeds to a step S610. Thus, after the power of the print control apparatus 102 is restored, the RIP processing is started by the power restoration-time RIP start flag set in the step S606, whereafter the job is stored in the print queue of the storage section 204 as a print-awaiting job by the print awaiting flag set in the step S607.

In the step S608, the job analysis section 206 determines whether or not the job cancelled by the job management section 203 has been in RIP (RIP-in-progress job). If it is determined that the job has been a RIP-in-progress job, the process proceeds to a step S609, whereas if it is determined that the cancelled job is not a RIP-in-progress job but a spool-in-progress job, the process proceeds to a step S611. In the step S611, the job management section 203 sets a spool cancellation notification flag (discrimination information) for notifying that the spooling of the job has been cancelled, for the cancelled job, and the process proceeds to the step S612.

In the step S609, the job management section 203 sets the power restoration-time RIP start flag for resuming the RIP processing upon power restoration of the print control apparatus 102, for the job which has been determined to be in RIP in the step S608, and the process proceeds to the step S610.

In the step S610, the storage section 204 stores the job cancelled in the step S602 in an original queue (waiting queue or print queue) of the storage section 204, and the process proceeds to the step S612.

In the step S612, the job analysis section 206 determines whether or not all the jobs in progress have been cancelled. If it is determined that all the jobs in progress have been cancelled, the process proceeds to a step S614, whereas if it is determined that not all the jobs in progress have been cancelled, the process proceeds to a step S613, wherein the job management section 203 acquires a next job in progress, and the process proceeds to the step S602.

In the step S614, the controller 201 determines whether or not the print control apparatus 102 has been configured to notify the user of jobs to be processed upon power restoration thereof. In the present embodiment, the determination is performed based on the setting information stored in the storage section 204. If it is determined that the print control apparatus 102 has been configured to notify the user of jobs to be processed upon power restoration thereof, the process proceeds to a step S615, whereas if not, the present process is immediately terminated.

In the step S615, the display section 208 notifies the user of jobs to be executed upon power restoration, before power-off. In the step S615, for example, the display section 208 functions as a power restoration-time processing notification unit. Specifically, the display section 208 acquires jobs to be executed upon power restoration from the job management section 203 via the controller 201, and displays the jobs in a message. An example of the message displayed on the display section 208 is shown in FIG. 13A.

Next, the power restoration-time process executed by the print control apparatus 102 upon power restoration of the print control apparatus 102 will be described with reference to FIGS. 7 and 8.

Figure 7:
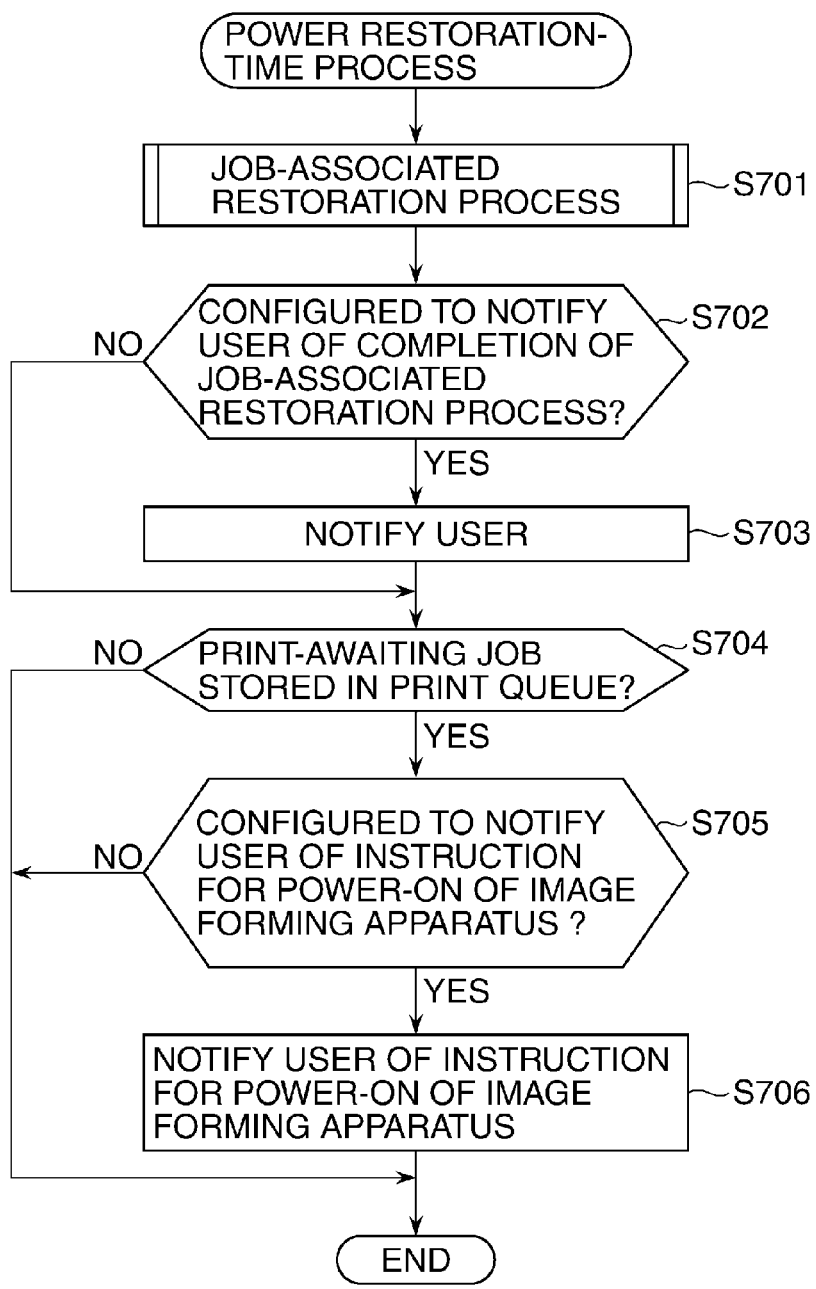
FIG. 7 is a flowchart of a power restoration-time process executed by the print control apparatus according to the first embodiment.

FIG. 7 is a flowchart of the power restoration-time process executed by the print control apparatus 102 according to the present embodiment. Note that a program for executing this process is stored in the storage section 204 of the print control apparatus 102, and is executed by the controller 201.

In a step S701, related sections of the print control apparatus 102 execute a job-associated restoration process for each job cancelled when the print control apparatus 102 is powered off. Details of the job-associated restoration process will be described hereinafter with reference to FIG. 8.

In a step S702, the controller 201 determines whether or not the print control apparatus 102 is configured to notify the user of completion of the job-associated restoration process. In the present embodiment, the determination is performed based on the setting information stored in the storage section 204. If it is determined that the print control apparatus 102 is configured to notify the user of completion of the job-associated restoration process, the process proceeds to a step S703, whereas if not, the process proceeds to a step S704.

In the step S703, the display section 208 displays a message notifying the user of completion of the job-associated restoration process. In doing this, the display section 208 also displays the details of processing performed on each job acquired from the job management section 203 by the controller 201. In the step S703, the display section 208 functions as a power restoration-time process completion notification unit. An example of the message displayed on the display section 208 is shown in FIG. 13B. This display of the message enables the user to comprehend at a glance each job which has been cancelled when the print control apparatus 102 is powered off and is automatically continued after power restoration of the print control apparatus 102. This makes it possible to save time and labor required for searching for a cancelled job.

In the step S704, the job management section 203 determines whether or not a print-awaiting job is stored in the print queue of the storage section 204. In the step S704, the job management section 203 functions e.g. as a job determination unit. If it is determined in the step S704 that a print-awaiting job is stored in the print queue, the process proceeds to a step S705, whereas if it is determined in the step S704 that no print-awaiting job is stored in the print queue, the present process is immediately terminated.

In the step S705, the controller 201 determines whether or not the print control apparatus 102 is configured to notify the user of an instruction for power-on of the image forming apparatus 101. In the present embodiment, the determination is performed based on the setting information stored in the storage section 204. If it is determined that the print control apparatus 102 is configured to notify the user of an instruction for power-on of the image forming apparatus 101, the process proceeds to a step S706, whereas if not, the present process is immediately terminated.

In the step S706, the display section 208 displays a message for instructing the user to restore the power of (power on) the image forming apparatus 101. In the step S706, for example, the display section 208 functions as a power restoration instruction notification unit. An example of the message displayed on the display section 208 is shown in FIG. 13C. This display of the message enables the user to power on the image forming apparatus 101 only when it is required to power on the image forming apparatus 101, which makes it possible to suppress useless power consumption and hence has a power saving effect as well.

Figure 8:
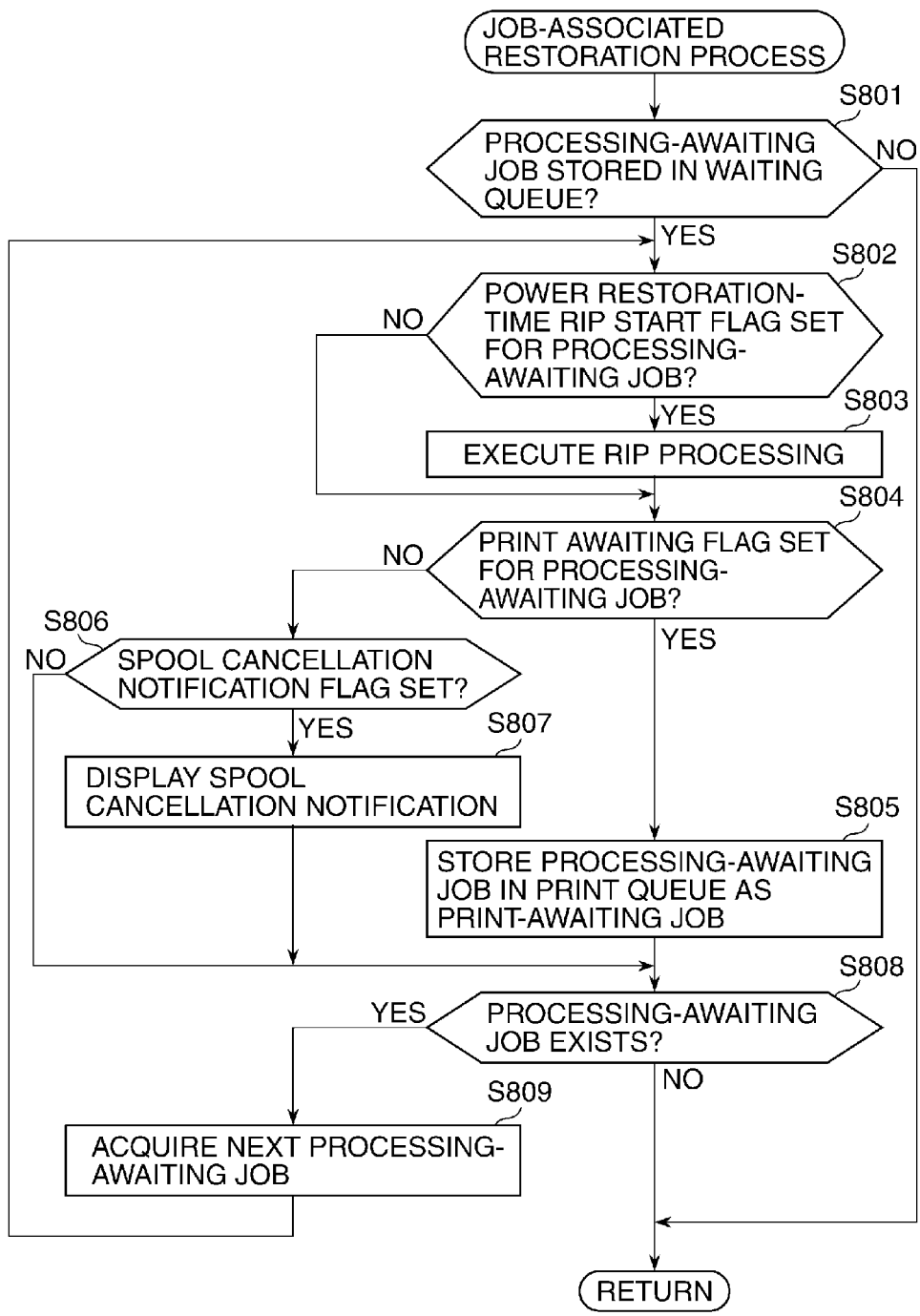
FIG. 8 is a flowchart of details of a job-associated restoration process executed by the print control apparatus in a step in FIG. 7.

FIG. 8 is a flowchart of details of the job-associated restoration process executed by the print control apparatus 102 in the step S701 in FIG. 7. Note that a program for executing this process is stored in the storage section 204 of the print control apparatus 102, and is executed by the controller 201.

In a step S801, the job analysis section 206 determines whether or not a processing-awaiting job is stored in the waiting queue of the storage section 204. If it is determined that a processing-awaiting job is stored in the waiting queue, the job analysis section 206 acquires the processing-awaiting job, and the process proceeds to a step S802. On the other hand, if it is determined that no processing-awaiting job is stored in the waiting queue, the process returns.

In the step S802, the job analysis section 206 determines whether or not the power restoration-time RIP start flag is set for the processing-awaiting job acquired in the step S801. In the step S802, for example, the job analysis section 206 functions as a discrimination information determination unit. If it is determined that the power restoration-time RIP start flag is set, the process proceeds to a step S803, wherein the RIP section 207 executes RIP processing. On the other hand, if it is determined that the power restoration-time RIP start flag is not set, the process proceeds to a step S804.

In the step S804, the job analysis section 206 determines whether or not a print awaiting flag is set for the acquired processing-awaiting job. In the step S804, for example, the job analysis section 206 functions as the discrimination information determination unit. If it is determined that the print awaiting flag is set for the acquired processing-awaiting job, the process proceeds to a step S805, whereas if it is determined that the print awaiting flag is not set in the acquired processing-awaiting job, the process proceeds to a step S806.

In the step S806, the job analysis section 206 determines whether or not the spool cancellation notification flag is set for the acquired processing-awaiting job. In the step S806, for example, the job analysis section 206 functions as the discrimination information determination unit. In the present embodiment, it is determined whether or not spool cancellation notification information (information on the setting of the spool cancellation notification flag) associated with the acquired processing-awaiting job is stored in the storage section 204. If it is determined that the spool cancellation notification information associated with the acquired processing-awaiting job is stored in the storage section 204, the process proceeds to a step S807, whereas if not, the process proceeds to a step S808.

In the step S807, the display section 208 displays a message notifying the user that there is a spool-cancelled job. During spooling, when a job is being transmitted from the client PC 105 to the job receiving section 202, the transmission of the job is cancelled by power-off of the printing system, so that the job does not remain in the print control apparatus 102. This requires the user to input the job from the client PC 105 again when the printing system is powered on. Therefore, by displaying the message notifying the user that the spooling of a job is cancelled, it is possible to prompt the user to input the job again. An example of such a job reinput request message displayed on the display section 208 is shown in FIG. 13D.

In the step S808, the job analysis section 206 determines whether or not restoration of all processing-awaiting jobs stored in the storage section 204 has been completed. If it is determined that the restoration of all the processing-awaiting jobs has been completed, the present process is terminated, whereas if it is determined that the restoration has not been completed, the process proceeds to a step S809. In the step S809, the job analysis section 206 acquires a next processing-awaiting job from the storage section 204, and the process proceeds to the step S802.

Figure 9:
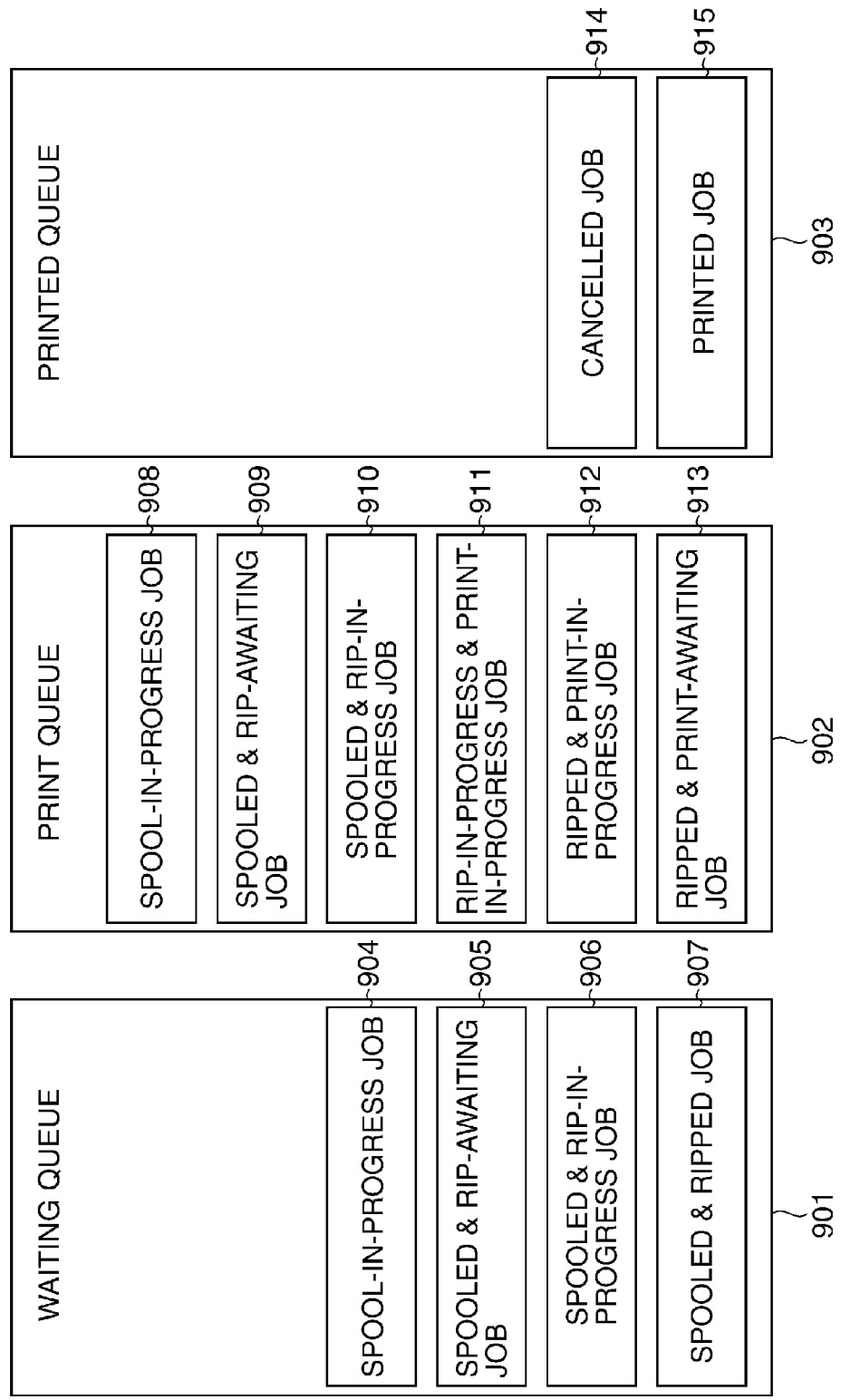
FIG. 9 is a diagram showing examples of a waiting queue, a print queue, and a printed queue stored in a storage section of the print control apparatus.

FIG. 9 is a diagram showing examples of the waiting queue, the print queue, and a printed queue, stored in the storage section 204 of the print control apparatus 102.

Referring to FIG. 9, the waiting queue 901 stores a spool-in-progress job 904, a spooled & RIP-awaiting job 905, a spooled & RIP-in-progress job 906, and a spooled & RIPped job 907.

The spool-in-progress job 904 is a job in a status being received from the client PC 105 by the job receiving section 202. The spooled & RIP-awaiting job 905 is a job which has been received by the job receiving section 202 and is awaiting RIP processing by the RIP section 207. The spooled & RIP-in-progress job 906 is a job which is undergoing the RIP processing by the RIP section 207. The spooled & RIPped job 907 is a job on which the RIP processing by the RIP section 207 has been completed.

The print queue 902 stores a spool-in-progress job 908, a spooled & RIP-awaiting job 909, a spooled & RIP-in-progress job 910, a RIP-in-progress & print-in-progress job 911, a RIPped & print-in-progress job 912, and a RIPped & print-awaiting job 913.

The spool-in-progress job 908 is a job in a status being received from the client PC 105 by the job receiving section 202. The spooled & RIP-awaiting job 909 is a job which has been received by the job receiving section 202 and awaiting the RIP processing by the RIP section 207. The spooled & RIP-in-progress job 910 is a job which is undergoing the RIP processing by the RIP section 207. The RIP-in-progress & print-in-progress job 911 is a job on which the RIP processing by the RIP section 207 and the print processing by the printer section 303 of the image forming apparatus 101 are being performed in parallel. The RIPped & print-in-progress job 912 is a job on which the RIP processing by the RIP section 207 has been completed and the print processing by the printer section 303 of the image forming apparatus 101 is being performed. The RIPped & print-awaiting job 913 is a job on the RIP processing by the RIP section 207 has been completed and is awaiting the print processing by the printer section 303.

The printed queue 903 stores jobs which have been processed sequentially in the print queue 902, as printed jobs 915. Further, the printed queue 903 stores jobs cancelled due to image data transfer error or operation by the user, as cancelled jobs 914.

The display section 208 displays information on the above-described queues stored in the storage section 204. The user views the information of the queues displayed on the display section 208 or the client PC 105, and performs necessary operations via the console section 209.

Figure 10:
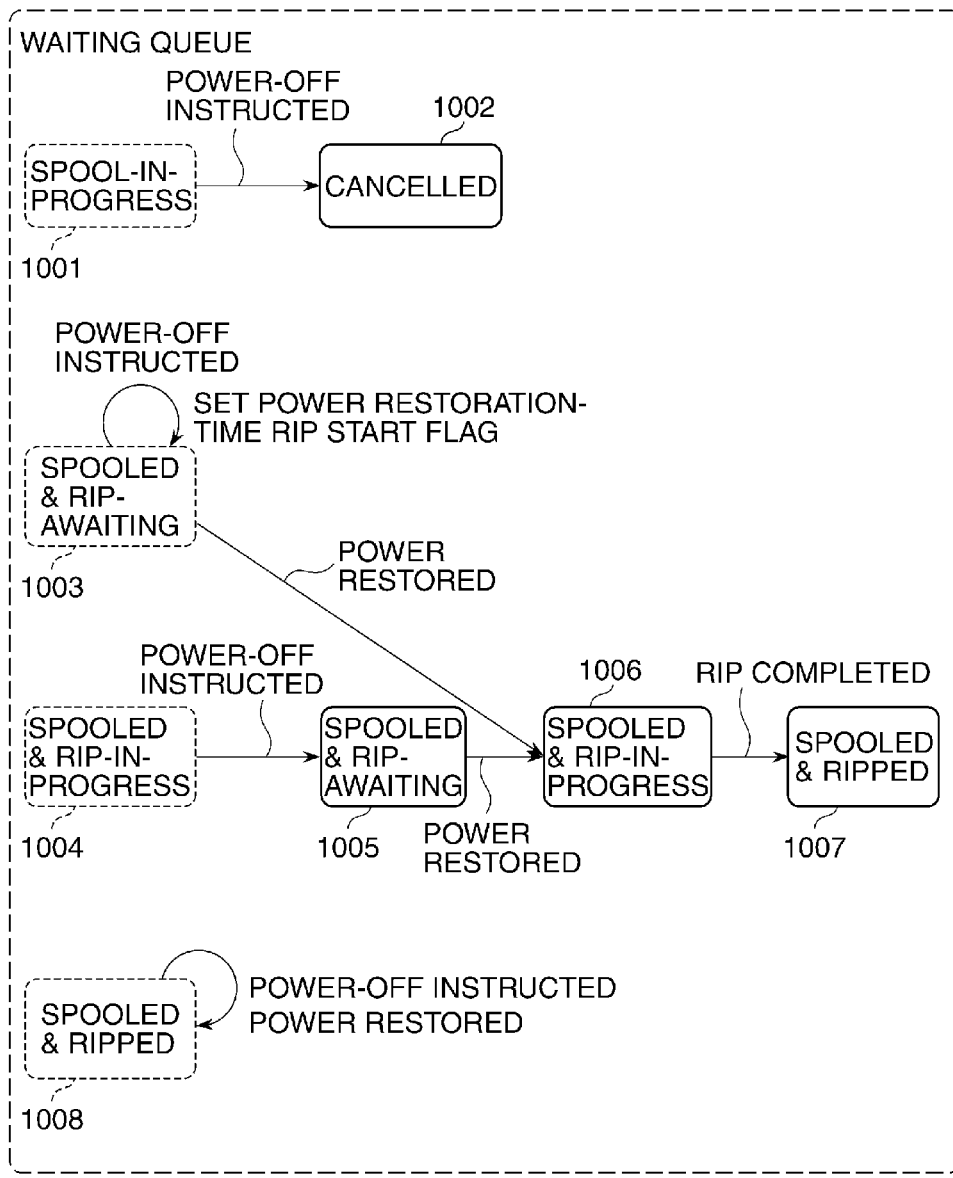
FIG. 10 is a diagram showing an example of status transitions of jobs stored in the waiting queue in the first embodiment.
Figure 11:
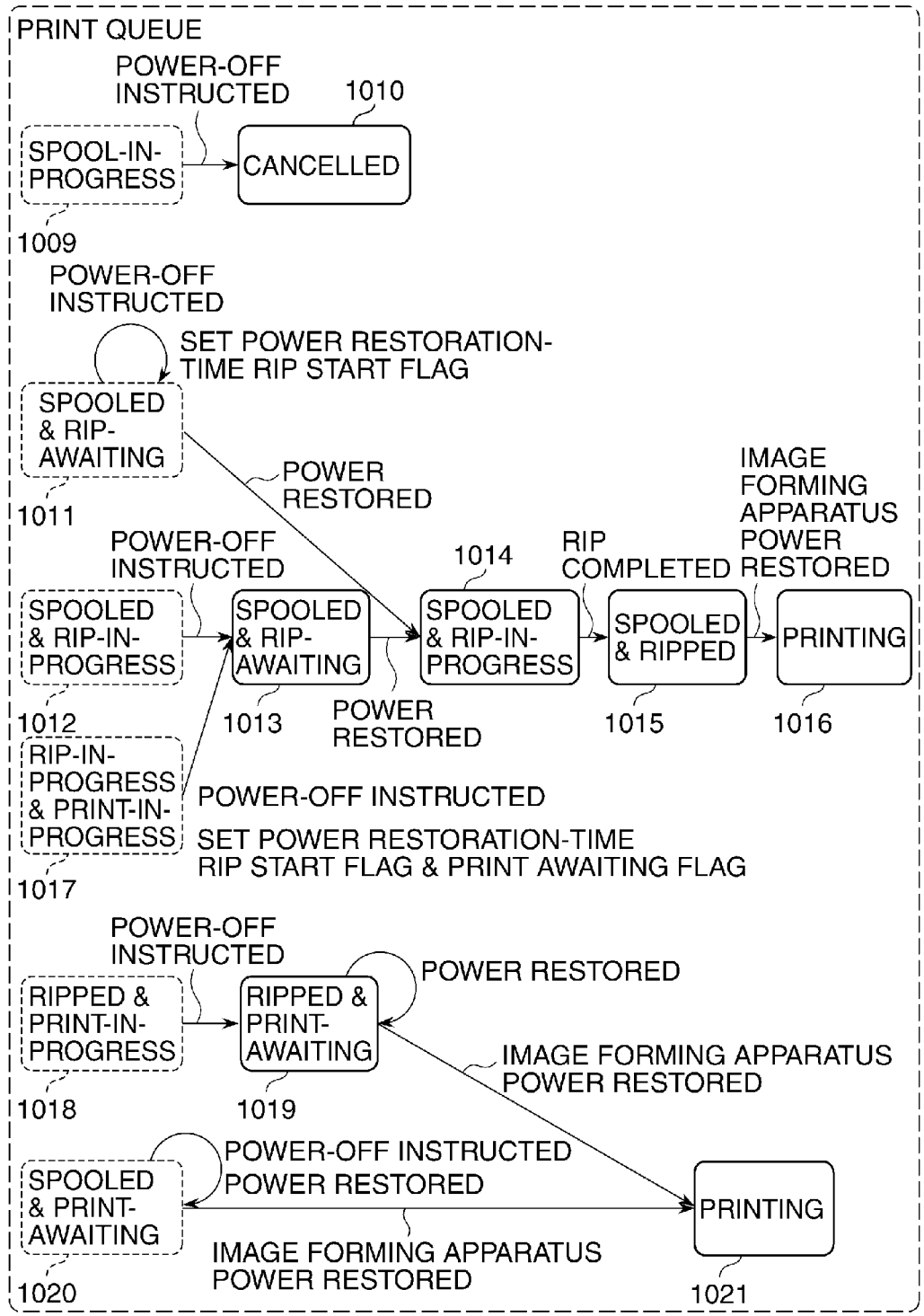
FIG. 11 is a diagram showing an example of status transitions of jobs stored in the print queue in the first embodiment.

FIGS. 10 and 11 show examples of status transitions of jobs in a case where during processing of jobs, the print control apparatus 102 is powered off in response to a power-off instruction, and after power restoration of the print control apparatus 102, the power of the image forming apparatus 101 is also restored.

FIG. 10 shows status transitions of jobs stored in the waiting queue 901.

Spool-in-progress 1001, spooled & RIP-awaiting 1003, and spooled & RIP-in-progress 1004 indicate respective statuses of jobs before the print control apparatus 102 receives the power-off instruction.

The job in spool-in-progress 1001 is in a spool-in-progress status in which the job is being received by the job receiving section 202 of the print control apparatus 102 from the client PC 105. When the print control apparatus 102 receives the power-off instruction, the job in spool-in-progress 1001 is transitioned to cancelled 1002, in other words, the job is cancelled.

The job in spooled & RIP-awaiting 1003 is in a status awaiting the RIP processing after completion of input thereof from the client PC 105. When the print control apparatus 102 receives the power-off instruction, the job in spooled & RIP-awaiting 1003 has the power restoration-time RIP start flag set therefor by the job management section 203 and remains in the spooled & RIP-awaiting status. After the print control apparatus 102 is powered on, the job analysis section 206 determines that the job in spooled & RIP-awaiting 1003 has the power restoration-time RIP start flag set therefor, and the job is transitioned to spooled & RIP-in-progress 1006. After having the RIP processing completed by the RIP section 207, the job is transitioned to spooled & RIPped 1007.

The job in spooled & RIP-in-progress 1004 is in a status being subjected to the RIP processing by the RIP section 207. When the print control apparatus 102 receives the power-off instruction, the RIP processing is suspended, and the job is transitioned to spooled & RIP-awaiting 1005.

The job in spooled & RIPped 1008 remains in the same status even after the print control apparatus 102 has received the power-off instruction, or even after the print control apparatus 102 is powered on.

FIG. 11 shows status transitions of jobs stored in the print queue 902.

Spool-in-progress 1009, spooled & RIP-awaiting 1011, spooled & RIP-in-progress 1012, RIP-in-progress & print-in-progress 1017, RIPped & print-in-progress 1018, and RIPped & print-awaiting 1020 indicate respective statuses of jobs before the print control apparatus 102 receives the power-off instruction.

The job in spool-in-progress 1009 is a job in a spool-in-progress status in which the job is being received by the job receiving section 202 of the print control apparatus 102 from the client PC 105. When the print control apparatus 102 receives the power-off instruction, the job in spool-in-progress 1009 is transitioned to cancelled 1010, in other words, the job is cancelled.

The job in spooled & RIP-awaiting 1011 is in a status awaiting the RIP processing after completion of input thereof from the client PC 105. When the print control apparatus 102 receives the power-off instruction, the job in spooled & RIP-awaiting 1011 has the power restoration-time RIP start flag set therefor by the job management section 203 and remains in spooled & RIP-awaiting 1011. After the print control apparatus 102 is powered on, the RIP processing is started by the RIP section 207, in other words, the job in spooled & RIP-awaiting 1011 is transitioned to spooled & RIP-in-progress 1014. After the RIP section 207 has completed the RIP processing, the job is transitioned to spooled & RIPped 1015. Then, after the image forming apparatus 101 is powered on, print processing is started by the printer section 303, in other words, the job is transitioned to printing 1016.

The job in spooled & RIP-in-progress 1012 is in a status being subjected to the RIP processing by the RIP section 207. When the print control apparatus 102 receives the power-off instruction, the job in spooled & RIP-in-progress 1012 is transitioned to spooled & RIP-awaiting 1013. After the print control apparatus 102 is powered on, the RIP processing is started by the RIP section 207, in other words, the job is transitioned to spooled & RIP-in-progress 1014.

The job in RIP-in-progress & print-in-progress 1017 is in a status having been designated for "RIP while print" and having been input, and being subjected to the RIP processing by the RIP section 207 and the print processing by the printer section 303 of the image forming apparatus 101 in parallel. When the print control apparatus 102 receives the power-off instruction, the job has the power restoration-time RIP start flag and the print awaiting flag set therefor by the job management section 203, and is transitioned to spooled & RIP-awaiting 1013.

The job in RIPped & print-in-progress 1018 is in a status having been set for "RIP then print" and having the RIP processing performed on all pages thereof and being subjected to print processing by the printer section 303. When the print control apparatus 102 receives the power-off instruction, the job is transitioned to RIPped & print-awaiting 1019. The job remains in RIPped & print-awaiting 1019 even after power restoration of the print control apparatus 102. After the power of the image forming apparatus 101 is restored, the job is transitioned to printing 1021. The job in printing 1021 is in a status being subjected to print processing by the printer section 303.

The job in RIPped & print-awaiting 1020 is in a status awaiting printing since the printer section 303 is printing another job. The job remains in the same status even after the print control apparatus 102 receives the power-off instruction. When the power of the print control apparatus 102 alone is restored, the job in RIPped & print-awaiting 1020 remains in the same status since the printer section 303 cannot start print processing. After the power of the image forming apparatus 101 is restored, the job is transitioned to printing 1021.

FIGS. 12A and 12B are diagrams of examples of a power-off configuration screen displayed on the display section 208 of the print control apparatus 102.

Referring to FIG. 12A, on the power-off configuration screen 1101, it is possible to set processing to be executed when the print control apparatus 102 is powered off, processing to be executed after the power of the print control apparatus 102 is restored, and details of notification to be made to the user. The contents set on the power-off configuration screen 1101 are stored in the storage section 204.

Jobs in progress at the time of power-off of the print control apparatus 102 are classified into print-in-progress job 1105, RIP-in-progress job 1106, print-awaiting job 1107, and RIP while print-in-progress job 1108. As a post-restoration processing setting, "auto" 1102 can be set for jobs in these four statuses according to which they are classified. When the "auto" 1102 is set, processing to be performed on each job after power restoration of the print control apparatus 102 is decided according to the status of the job at the time of power-off of the print control apparatus 102.

For print-in-progress job 1105 and RIP-in-progress job 1106, "resume from stopped position" 1103 and "re-process from start" 1104 can be set. When a job (RIP-in-progress job or print-in-progress job) has the "resume from stopped position" 1103 set thereto, a job part having processing therefor completed before the power-off of the print control apparatus 102 is not processed again, but processing of the job is resumed from next to the job part having the processing therefor completed.

When the "re-process from start" 1104 is set, processing designated in advance is started from the start thereof irrespective of a processing status before the power-off of the print control apparatus 102.

When "notification setting" 1109 is set, details of processing to be performed at power-off and upon power restoration of the print control apparatus 102, which are set by the user on the power-off configuration screen 1101, are notified (see FIG. 13A).

When "notification setting" 1110 is set, details of processing performed after power restoration of the print control apparatus 102 and until completion of the job-associated restoration process are notified to the user, after power restoration of the print control apparatus 102 and completion of the job-associated restoration process after the power restoration (see FIG. 13B).

When "notification setting" 1111 is set, if a print-awaiting job is stored in the storage section 204 at the time of power restoration of the print control apparatus 102 and completion of the job-associated restoration process, a power-on instruction for powering on the image forming apparatus 101 is notified to the user (see FIG. 13C).

FIGS. 13A to 13D are diagrams of examples of messages displayed on the display section 208 when the notification settings 1109, 1110, and 1111 are set on the power-off configuration screen 1101, and the aforementioned job reinput request message displayed on the display section 208 when spooling is cancelled.

The message shown in FIG. 13A is displayed in the case where the notification setting 1109 is set. The illustrated example displays details of processing of jobs A and B to be performed after power restoration of the print control apparatus 102.

The message shown in FIG. 13B is displayed in the case where the notification setting 1110 is set. The illustrated example displays the statuses of the jobs A and B after power restoration of the print control apparatus 102 and completion of the job-associated restoration process.

The message shown in FIG. 13C is displayed in the case where the notification setting 1111 is set. The illustrated example displays details of the message that prompts the user to power on the image forming apparatus 101 in a state where the job-associated restoration process by the print control apparatus 102 has been completed and there is a print-awaiting job stored in the print queue.

The message shown in FIG. 13D is displayed on the display section 208 in the case where the job analysis section 206 determines in the step S807 in FIG. 8 that spooling has been cancelled.

According to the first embodiment described above, the statuses of cancelled jobs are analyzed, and jobs to be executed or continued after power restoration of the print control apparatus 102 are stored in the print queue or the waiting queue according to the results of the analyses. Then, flags set for jobs stored in the print queue or the like are determined after the power of the print control apparatus 102 is restored, and a post-restoration continued processing of each job is executed according to the results of the determination. This makes it possible to perform continued processing of the jobs upon power restoration according to the statuses of the jobs before power-off of the print control apparatus 102. As a consequence, the user can perform operations upon power restoration without being conscious of the statuses of the jobs before power-off of the print control apparatus 102 and without instructing reprocessing of the jobs. Further, it is possible to improve operability and overall productivity without requiring high-level determination by the user.

Although in the above-described first embodiment, the description has been given of the power restoration-time process executed in the case where only the power of the print control apparatus 102 alone is restored after power-off of the image forming apparatus 101 and the print control apparatus 102, there is also a case where both the power of the image forming apparatus 101 and that of the print control apparatus 102 are simultaneously restored. Therefore, in a second embodiment of the present invention, a description will be given of processing executed when the power of the image forming apparatus 101 and that of the print control apparatus 102 are simultaneously restored. Note that in the second embodiment, the configurations shown in FIGS. 1 to 3 are the same as in the above-described first embodiment. Therefore, the same components and elements as those of the first embodiment are denoted by the same reference numerals, and description thereof is omitted. In the following, a description will be given only of different points from the first embodiment.

Figure 14:
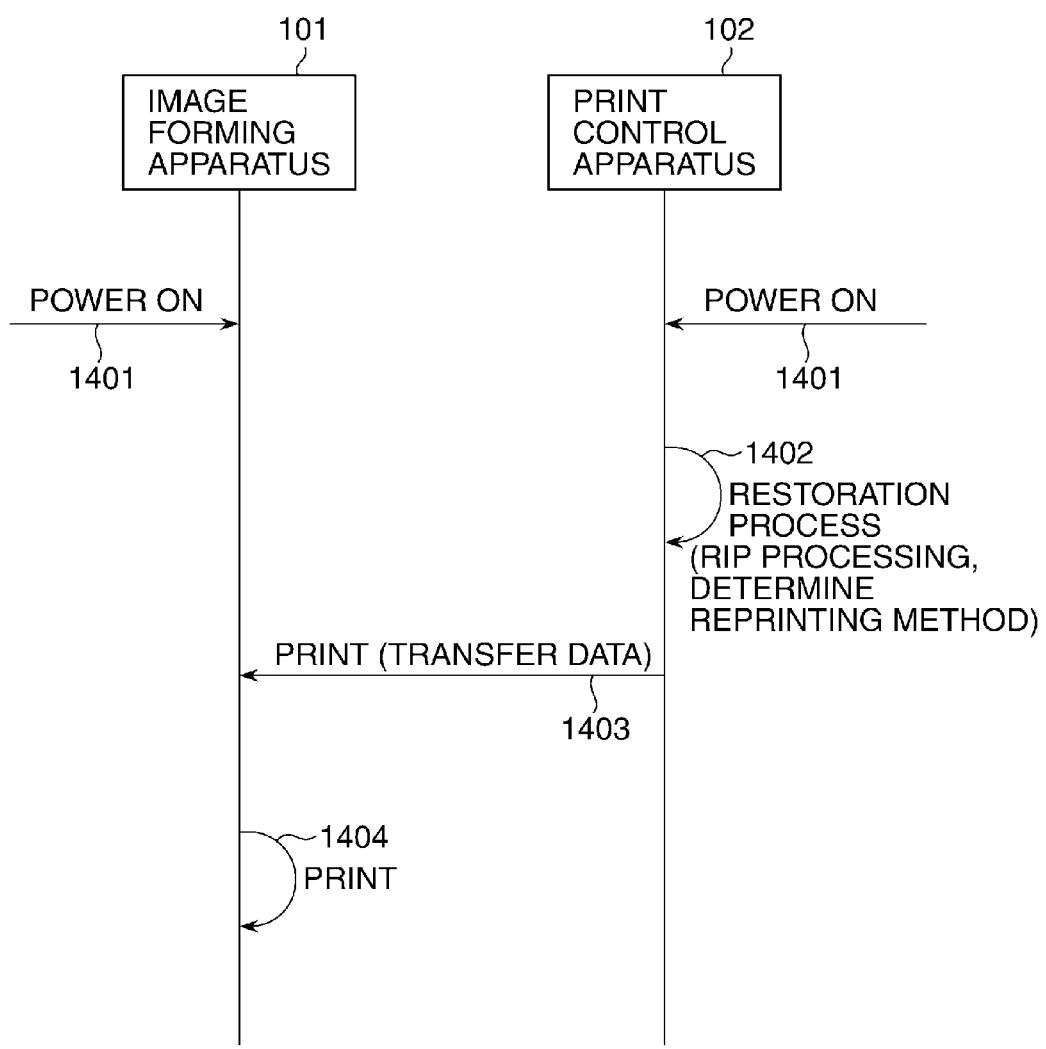
FIG. 14 is a sequence diagram showing a case where both of the power of an image forming apparatus and that of a print control apparatus according to a second embodiment are restored.

FIG. 14 is a sequence diagram showing a case where both of the power of the image forming apparatus 101 and that of the print control apparatus 102 according to the second embodiment are restored.

The power of image forming apparatus 101 and that of the print control apparatus 102 are restored by the user, respectively (1401). The print control apparatus 102 starts a job-associated restoration process after power restoration thereof (1402). Here, the print control apparatus 102 performs continued processing according to the status of each job cancelled at power-off of the print control apparatus 102. The print control apparatus 102 determines a reprinting method based on the settings and the statuses of the job, and transfers image data to the image forming apparatus 101 according to the results of the determination (1403). The image forming apparatus 101 executes printing of the received image data (1404).

Next, a description will be given of the power restoration-time process executed by the print control apparatus 102 according to the present embodiment.

Figure 15:
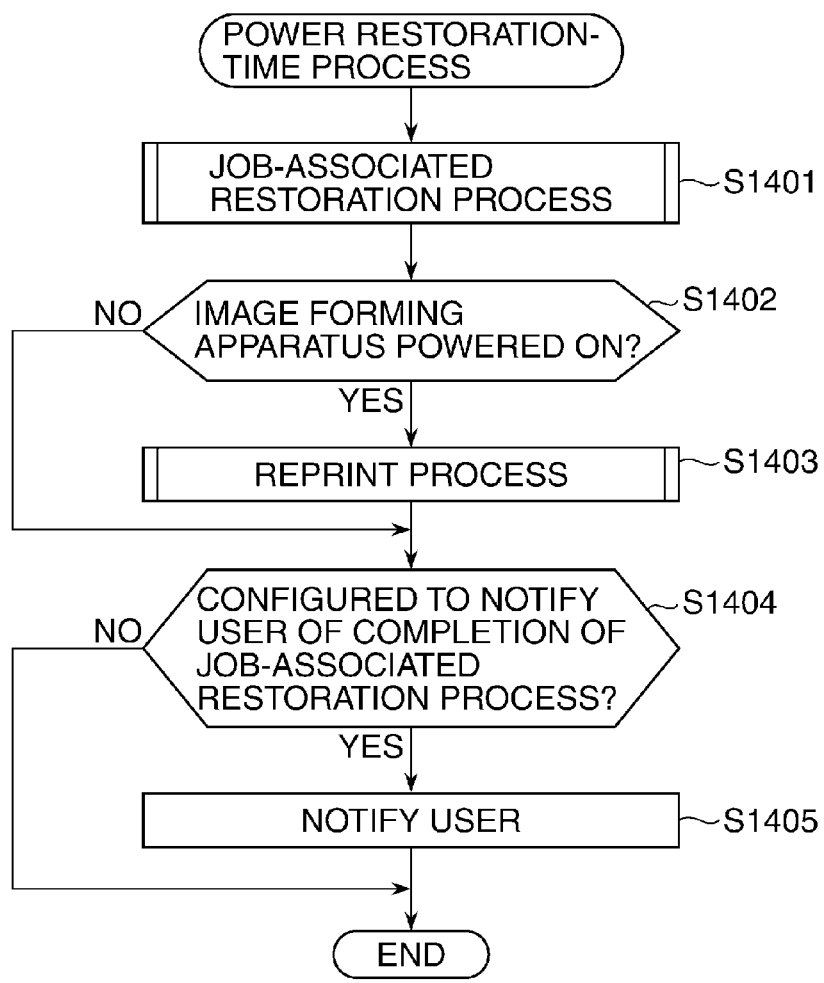
FIG. 15 is a flowchart of details of a job-associated restoration process executed by the print control apparatus according to the second embodiment.

FIG. 15 is a flowchart of the power restoration-time process executed by the print control apparatus 102 according to the second embodiment. Note that a program for executing this process is stored in the storage section 204 of the print control apparatus 102, and is executed by the controller 201.

In a step S1401, related sections of the print control apparatus 102 executes the job-associated restoration process described with reference to FIG. 8. Next, in a step S1402, the interface section 205 determines whether or not the power of the image forming apparatus 101 is on. If it is determined that the power of the image forming apparatus 101 is on, the process proceeds to a step S1403, whereas if it is determined that the power of the image forming apparatus 101 is off, the process proceeds to a step S1404.

In the step S1403, a reprint process is executed by related sections of the print control apparatus 102. Details of this process will be described with reference to FIG. 16.

In the step S1404, the job analysis section 206 determines whether or not the print control apparatus 102 is configured to notify the user of completion of the job-associated restoration process. In the present embodiment, the determination is performed based on setting information stored in the storage section 204. If it is determined that the print control apparatus 102 is configured to notify the user of completion of the job-associated restoration process, the process proceeds to a step S1405, whereas if not, the present process is immediately terminated.

In the step S1405, the display section 208 acquires details of processing performed on each job by the job-associated restoration process from the job management section 203, and displays the details of the processing and completion of the job-associated restoration process on the display section 208.

Figure 16:
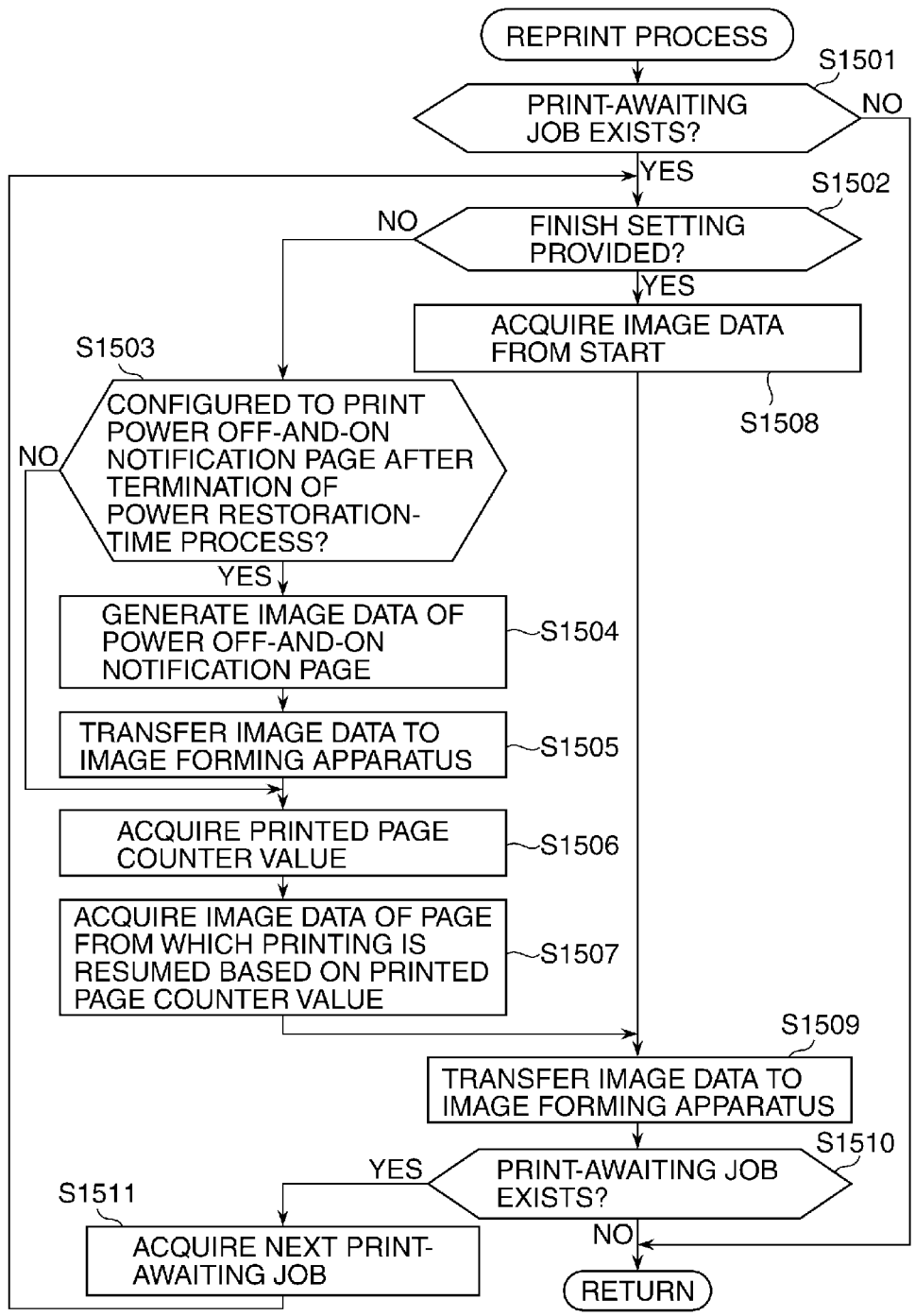
FIG. 16 is a flowchart of a reprint process executed in a step in FIG. 15.

FIG. 16 is a flowchart of details of the reprint process executed in the step S1403 in FIG. 15. Note that a program for executing this process is stored in the storage section 204 of the print control apparatus 102, and is executed by the controller 201.

In a step S1501, the job management section 203 determines whether or not there is stored a print-awaiting (processing-awaiting) job in the print queue of the storage section 204. If it is determined that there is stored a print-awaiting job in the print queue, the job management section 203 transfers the print-awaiting job (a first print-awaiting job when a plurality of print-awaiting jobs are stored) to the job analysis section 206, and the process proceeds to a step S1502. On the other hand, if it is determined that no print-awaiting job is stored in the print-waiting queue, the present process is immediately terminated.

In the step S1502, the job analysis section 206 determines whether or not the print-awaiting job received from the job management section 203 has a finish setting therefor. In the step S1502, for example, the job analysis section 206 functions as a finish setting determination unit. If it is determined that the print-awaiting job has a finish setting therefor, the process proceeds to a step S1508, whereas if it is determined that the print-awaiting job does not have a finish setting therefor, the process proceeds to a step S1503. This is because e.g. when finish setting information includes a setting of stapling, it is impossible to perform stapling in such a manner that printed pages are included, which requires pages to be reprinted from the start.

In the step S1503, the job management section 203 determines whether or not the print control apparatus 102 is configured to print a power off-and-on notification page after termination of the power restoration-time process. Here, it is determined whether or not information on a setting therefor is stored in the storage section 204. If it is determined that the print control apparatus 102 is configured to print a power off-and-on notification page, the process proceeds to a step S1504, whereas if not, the process directly proceeds to a step S1506.

In the step S1504, the job management section 203 generates image data of the power off-and-on notification page (power off-and-on notification print data) indicating that power on & off processing has been executed, and the RIP section 207 performs the RIP processing.

Next, in a step S1505, the interface section 205 transfers image data of the power off-and-on notification page subjected to the RIP processing (a page next to the printed pages) to the interface section 302 of the image forming apparatus 101.

In the step S1506, the job management section 203 acquires a printed page counter value via the interface section 302 of the image forming apparatus 101. In a step S1507, the job management section 203 acquires image data of a page from which printing is to be resumed, based on the acquired printed page counter value.

In a step S1509, the interface section 205 transfers the image data to be printed to the interface section 302 of the image forming apparatus 101. In a step S1510, the job management section 203 determines whether or not there remains a print-awaiting job stored in the print queue of the storage section 204. If it is determined that there remains a print-awaiting job in the print queue, the process proceeds to a step S1511, whereas if it is determined that there remains no print-awaiting job in the print queue, the present process is immediately terminated.

In the step S1511, the job management section 203 acquires a next print-awaiting job stored in the print queue of the storage section 204, and the process proceeds to the step S1502.

Here, a power-off configuration screen 1602 is shown in FIG. 12B. The power-off configuration screen 1602 is formed by adding a check box 1601 for setting whether or not to print the power off-and-on notification page after power restoration of the image forming apparatus 101 and the print control apparatus 102, to the power-off configuration screen 1101 shown in FIG. 12A.

By setting the check box 1601, it is possible to print the power off-and-on notification page in a predetermined format between a page of a job cancelled by the power-off of the apparatuses 101 and 102, printed before the power-off, and a page of the same, printed after power restoration of the apparatuses 101 and 102. This makes it possible for the user to determine the number of pages printed after power restoration at a glance. This is effective, e.g. for determining a page from which a change in printed conditions starts, in case the change is caused in a manner influenced by the occurrence of a change in the state of the image forming apparatus occurs.

According to the above-described second embodiment, when both of the power of the image forming apparatus 101 and that of the print control apparatus 102 are restored, it is possible to control pages to be subjected to the reprint process according the finish setting of jobs cancelled by the power-off of the image forming apparatus 101 and the print control apparatus 102. This makes it possible to prevent wasteful printing during reprocessing of the jobs.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2012-037327 filed Feb. 23, 2012, which is hereby incorporated by reference herein in its entirety.

What is claimed is:

1. A print control apparatus that is connected to an image forming apparatus and is powered off in a manner interlocked with the image forming apparatus according to a power-off instruction, comprising:
   a storage section configured to store jobs;
   a cancellation unit configured to cancel jobs in progress according to the power-off instruction;
   a job analysis unit configured to determine a status of each job cancelled by said cancellation unit;
   a post-restoration processing-setting unit configured to set discrimination information for each job to be processed after power restoration of the print control apparatus, according to the status of the job determined by said job analysis unit;
   a storage unit configured to store the jobs cancelled by said cancellation unit in said storage section according to the discrimination information set by said post-restoration processing-setting unit;
   a discrimination information determination unit configured to determine discrimination information of each job stored in said storage unit upon power restoration of the print control apparatus; and
   a post-restoration continued processing unit configured to execute continued processing of each job stored in said storage section according to a result of determination by said discrimination information determination unit,
   wherein when said job analysis unit determines that the cancelled job is a RIP while print-in-progress job, said post-restoration processing-setting unit changes the job to a "RIP then print" job, and sets a print awaiting flag, for the job, as discrimination information.

2. The print control apparatus according to claim 1, wherein when said job analysis unit determines that the cancelled job is a RIP-in-progress job, said post-restoration processing-setting unit sets a power restoration-time RIP start flag for resuming RIP processing upon power restoration of the print control apparatus, for the job, as discrimination information.

3. The print control apparatus according to claim 1, wherein when said job analysis unit determines that the cancelled job is a spool-in-progress job, said post-restoration processing-setting unit sets a spool cancellation notification flag for notifying a user that spooling has been cancelled, upon power restoration of the print control apparatus, for the job, as discrimination information.

4. The print control apparatus according to claim 1, wherein when said job analysis unit determines that the cancelled job is a print-in-progress job or a print-awaiting job, said storage unit stores the job in said storage section as a print-awaiting job.

5. The print control apparatus according to claim 1, wherein when said job analysis unit determines that the cancelled job is a RIP while print-in-progress job or a RIP-in-progress job, said storage unit stores the job in a waiting queue of said storage section.

6. The print control apparatus according to claim 1, further comprising a power restoration-time processing notification unit configured to notify a user of processing to be performed on the cancelled job upon power restoration of the print control apparatus, before power-off of the print control apparatus.

7. The print control apparatus according to claim 1, wherein when said discrimination information determination unit determines that a job stored in said storage section has a power restoration-time RIP start flag for resuming RIP processing upon power restoration of the print control apparatus, set therefor, said post-restoration continued processing unit executes RIP processing on the job.

8. The print control apparatus according to claim 1, wherein when said discrimination information determination unit determines that a job stored in said storage section has a print awaiting flag set therefor, said post-restoration continued processing unit stores the job in a print queue of said storage section as a print-awaiting job.

9. The print control apparatus according to claim 1, further comprising a spool cancellation notification unit configured to notify a user that there is a spool-cancelled job, when said discrimination information determination unit determines that a job stored in said storage section has a spool cancellation notification flag for notifying a user that spooling has been cancelled, upon power restoration of the print control apparatus, set therefor.

10. The print control apparatus according to claim 1, further comprising a power restoration-time process completion notification unit configured to notify a user of completion of processing executed on the cancelled job upon power restoration of the print control apparatus and details of the processing, after power restoration of the print control apparatus.

11. The print control apparatus according to claim 1, further comprising:
   a print-awaiting job determination unit configured to determine whether or not a print-awaiting job is stored in a print queue of said storage section, after power restoration of the image forming apparatus; and
   a power restoration instruction notification unit configured to notify a user of an instruction for power restoration of the print control apparatus, when said print-awaiting job determination unit determines that the print-awaiting job is stored in the print queue.

12. The print control apparatus according to claim 1, further comprising a power-off setting unit configured to set processing to be executed when the print control apparatus is powered off, processing to be executed after power restoration of the print control apparatus, and details of a notification to be made to a user.

13. The print control apparatus according to claim 12, wherein said power-off setting unit is capable of providing a setting for deciding post-restoration processing to be performed, at a time of power-off the print control apparatus, on a job in one of respective statuses of a print-in-progress job, a RIP-in-progress job, a print-awaiting job, and a RIP while print-in-progress job, according to a status of the job at the time of power-off of the print control apparatus, and wherein as to the print-in-progress job and the RIP-in-progress job, said power-off setting unit is capable of providing a setting for resuming processing from a stopped position thereof without reprocessing a portion processed before power-off of the print control apparatus, or a setting for starting processing designated in advance from a start thereof irrespective of a processing status before power-off of the print control apparatus.

14. The print control apparatus according to claim 12, wherein said power-off setting unit is capable of providing at least one of a setting for notification to the user before power-off of the print control apparatus, a setting for notification of details of processing after power restoration of the print control apparatus, and a setting for notifying the user of an instruction for powering on the image forming apparatus when the processing to be executed upon power restoration of the print control apparatus is completed.

15. The print control apparatus according to claim 12, further comprising an output unit configured to output a fact that power off-and-on processing has been executed between processing executed before power-off of the print control apparatus and processing executed after power restoration of the print control apparatus, as power off-and-on notification print data.

16. The print control apparatus according to claim 15, wherein said power-off setting unit is capable of providing a setting for outputting the power off-and-on notification print data so as to notify that the power off-and-on processing has been executed, upon power restoration of the print control apparatus.

17. The print control apparatus according to claim 1, further comprising:
a finish setting determination unit configured to determine whether or not a print-awaiting job stored in said storage section has a finish setting set therefor, after power restoration of the print control apparatus and the image forming apparatus; and
a resuming unit configured to resume continued processing of the job stored in said storage section from a start of the job stored in said storage section or from a page next to printed pages, according to a result of determination by said finish setting determination unit.

18. A method of controlling a print control apparatus that includes a storage section for storing jobs, and is connected to an image forming apparatus and is powered off in a manner interlocked with the image forming apparatus according to a power-off instruction, comprising:
cancelling jobs in progress according to the power-off instruction;
determining a status of each cancelled job;
setting discrimination information for each job to be processed after power restoration of the print control apparatus, according to the determined status of the job;
storing each cancelled job in the storage section according to the set discrimination information;
determining discrimination information of each job stored in the storage section upon power restoration of the print control apparatus; and
executing continued processing of each job stored in the storage section according to a result of determination of the discrimination information,
wherein when the cancelled job is a RIP while print-in-progress job, the job is changed to a "RIP then print" job, and a print awaiting flag is set, for the job, as discrimination information.

19. A non-transitory computer-readable storage medium storing a computer-executable program for causing a computer to execute a method of controlling a print control apparatus that includes a storage section for storing jobs, and is connected to an image forming apparatus and is powered off in a manner interlocked with the image forming apparatus according to a power-off instruction,
wherein the method comprises:
cancelling jobs in progress according to the power-off instruction;
determining a status of each cancelled job;
setting discrimination information for each job to be processed after power restoration of the print control apparatus, according to the determined status of the job;
storing each cancelled job in the storage section according to the set discrimination information;
determining discrimination information of each job stored in the storage section upon power restoration of the print control apparatus; and
executing continued processing of each job stored in the storage section according to a result of determination of the discrimination information,
wherein when the cancelled job is a RIP while print-in-progress job, the job is changed to a "RIP then print" job, and a print awaiting flag is set, for the job, as discrimination information.

* * * * *